INVENTOR.
RUDOLPH A. GOEPFRICH
BY
Jn. W. M Conkey
ATTORNEY.

June 20, 1944.  R. A. GOEPFRICH  2,351,952
BRAKE
Filed Dec. 26, 1939  3 Sheets-Sheet 2

INVENTOR.
RUDOLPH A. GOEPFRICH
BY
M. W. McConkey
ATTORNEY.

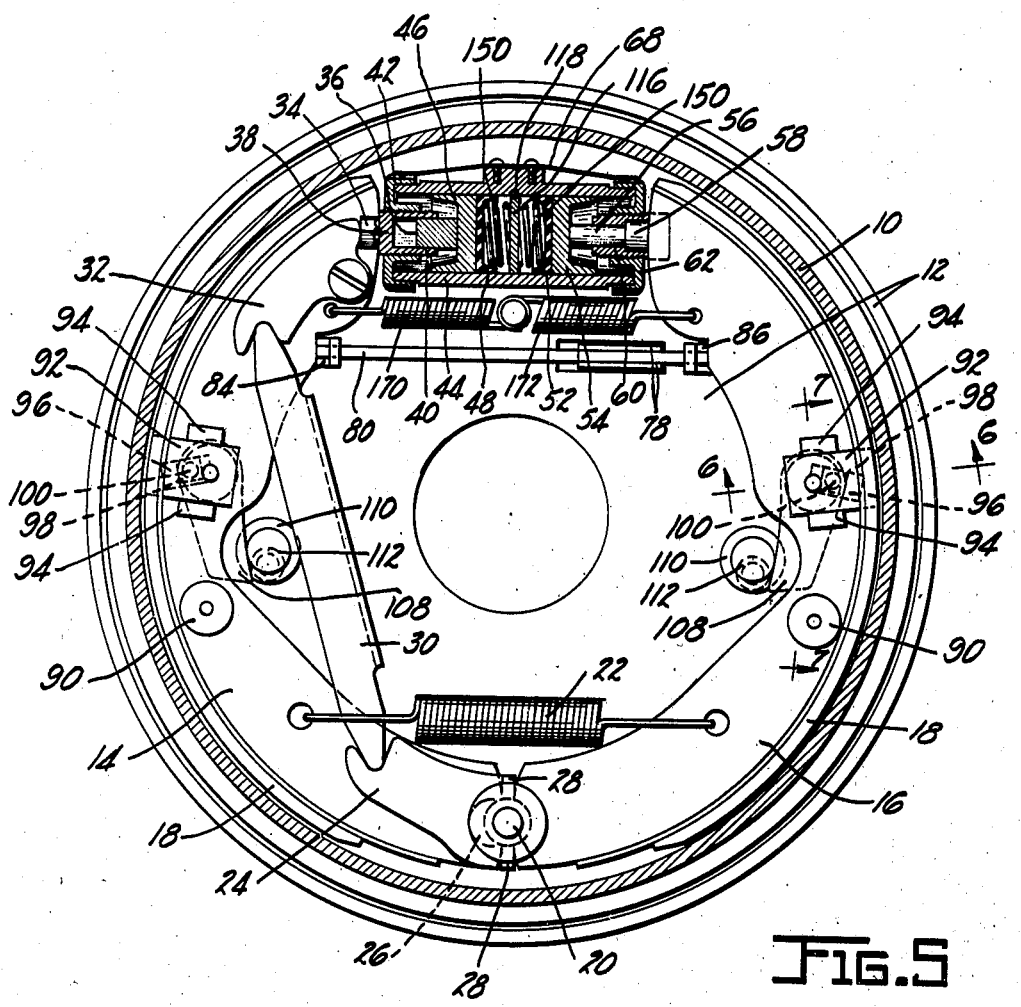

Patented June 20, 1944

2,351,952

UNITED STATES PATENT OFFICE 2,351,952

BRAKE

Rudolph A. Goepfrich, South Bend, Ind., assignor to Bendix Aviation Corporation, South Bend, Ind., a corporation of Delaware Application December 26, 1939, Serial No. 311,044

14 Claims. (Cl. 188—152)

This invention relates to brakes, and is illustrated as embodied in an internal expanding brake for an automobile.

An object of the invention is to provide a practical automatic adjustment for lining wear in a brake having shoes which shift individually to anchor at opposite ends so that both of them are fully effective both in forward and in reverse braking. The preferred adjustment is of the type actuated by engagement with the drum, so that it is not affected by expansion and contraction of the drum as it heats up and cools off, and in the arrangement shown this gradually shifts the released position of one end of each shoe away from the anchorage for that end of the shoe.

An important feature of the invention has to do with cushioning the shock if the shoe shifts so that this end of the shoe is anchored when the brake is applied. The cushioning, in the illustrated embodiment, is accomplished by forming the wheel cylinder of the brake to act as a dashpot when one of the shoes shifts its anchorage in this manner.

Another object of the invention is to provide applying means for individually shiftable shoes of the type described, including a mechanical applying device acting on the ends of the shoes at one side of the brake, and which is operated by another (preferably hydraulic) applying device at the opposite side of the brake, the second applying device also acting directly on the ends of the shoes at its side of the brake.

Figure 1:
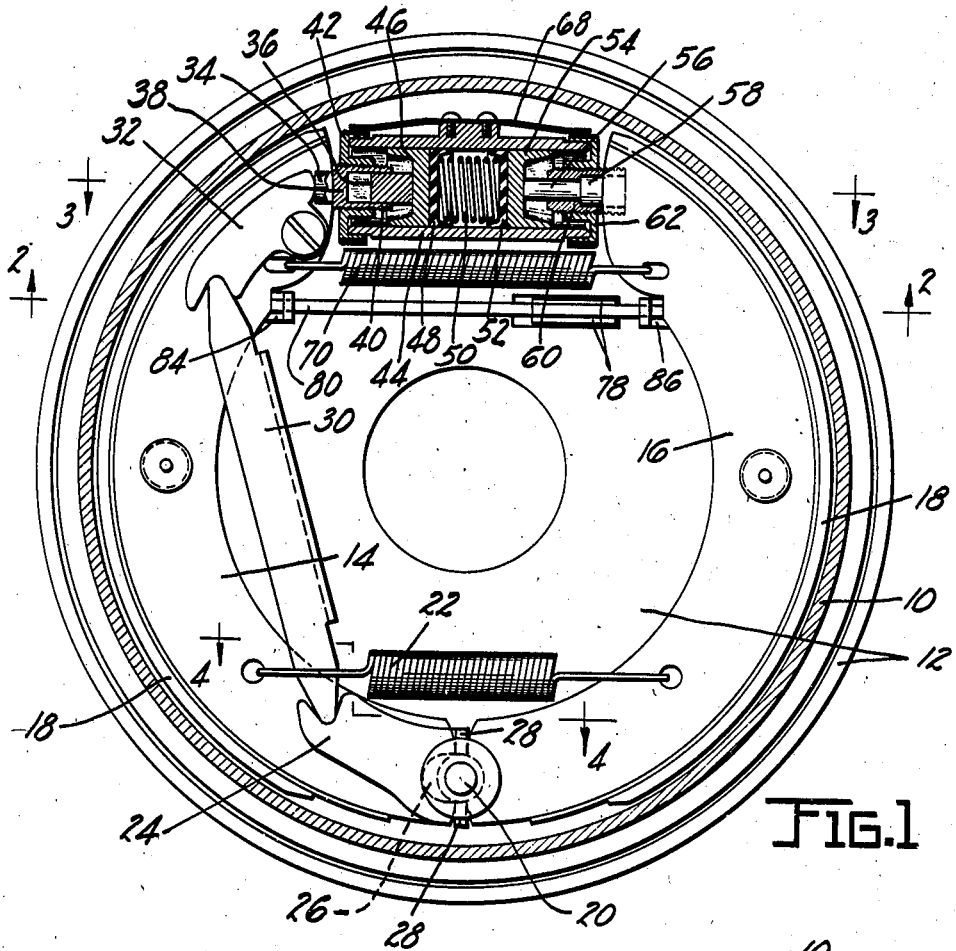
Figure 2:
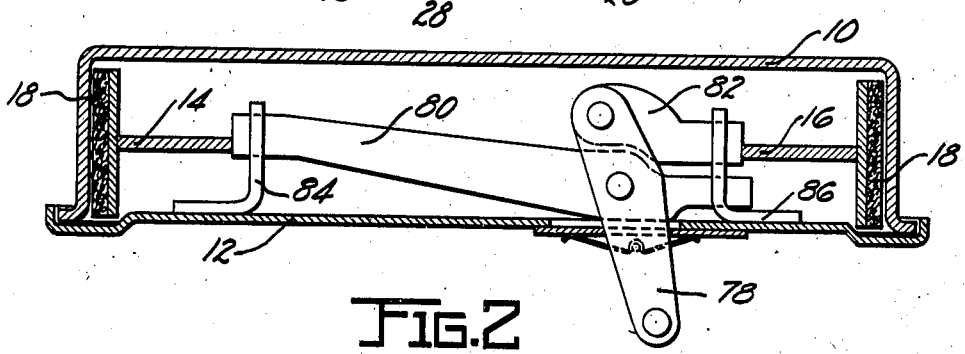
Figure 3:
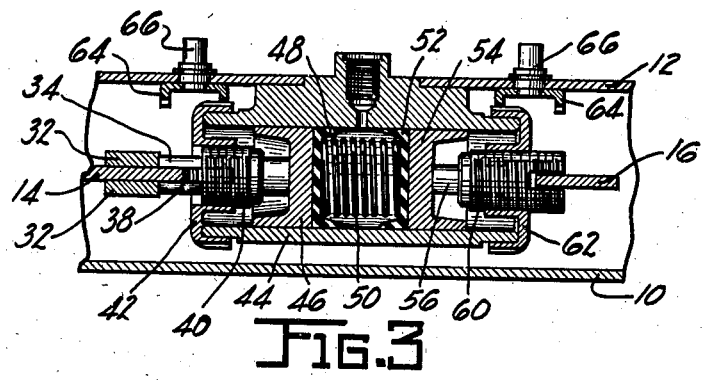
Figure 4:
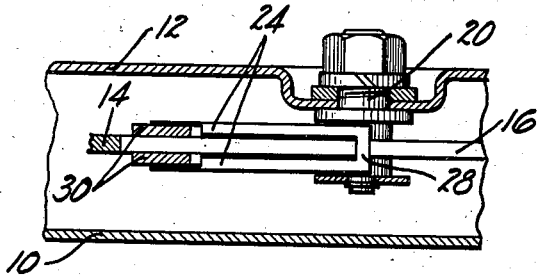
Figure 7:
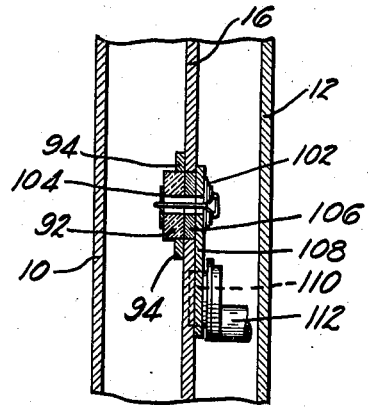
Figure 6:
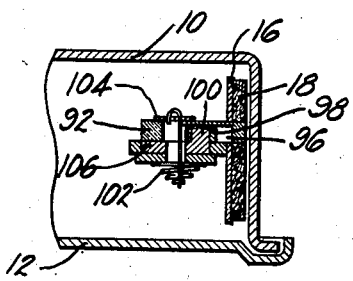

The above and other objects and features of the invention, including various novel combinations of parts and desirable particular constructions, will be apparent from the following description of the illustrative embodiments shown in the accompanying drawings, in which:

Figure 1 is a vertical section through a modification which is not provided with the above-described automatic adjustment, in a plane just inside the head of the brake drum and showing the brake shoes in side elevation;

Figures 2, 3, and 4 are partial sections on the lines 2—2, 3—3, and 4—4 of Figure 1;

Figure 5 is a section corresponding to Figure 1, but showing the brake provided with automatic adjusting means; and Figures 6 and 7 are partial sections on the lines 6—6 and 7—7 of Figure 5.

The brake illustrated in Figures 1-4 comprises a drum 10, at the open side of which is a support 12, and within which are arranged T-section brake shoes 14 and 16 faced with suitable brake lining 18. The lower ends of the shoes are notched to fit against opposite sides of a fixed anchor post 20 mounted on the backing plate, a spring 22 being tensioned between the shoes to urge them toward this anchorage.

The lower end of the web of shoe 14 is straddled by the two parts of a floating bellcrank lever 24, notched out at 26 to form integral connecting portions 28 which in effect form cams above and below the anchor 20 between the ends of the webs of the two shoes.

The notch 26 permits the lever to float horizontally along a chord of the drum, with the shoes, as one shoe or the other anchors on post 20 when the brake is applied, and since the notch 26 embraces the anchor post 20 the post prevents vertical movement of the lever. The lever 24 forms a mechanical applying device for the lower ends of the shoes.

The lever 24 is actuated when the brake is applied, by thrust from a U-section thrust link 30, the sides of which at the ends of the link straddle the web of shoe 14. The ends of the side walls of link 30 are rounded to fit pivotally into notches in the two parts of lever 24, and in two bellcrank levers 32 pivoted on the opposite sides of the upper portion of the web of shoe 14.

The bellcrank levers 32 are engaged (Figures 1 and 3) by the end portions of a plunger 34 which is provided with a slot the width of the shoe web, and which embraces the shoe web, and which extends back to 36 (Figure 1). The slot also embraces an anchoring bridge 38 which is integral with a hollow adjusting screw 40 threaded into an anchor cap 42 which fits slidably over and anchors against the end of a wheel cylinder 44 bolted to the backing plate.

The inner end of the plunger 34 seats against a piston 46 in the cylinder 44. The piston 46 is faced by a rubber sealing cup 48 held by a spring 50 which also holds a sealing cup 52 for a second piston 54 engaging a plunger 56 which has a head 58 in thrust engagement with the end of the web of the shoe 16. The plunger 56 passes through, and the head 58 seats in a recess in, an annular adjusting member 60, against the end of which the web of shoe 16 anchors when the drum is turning counter-clockwise (Figure 1). The member 60 has adjustably threaded thereon an anchor cap 62 which fits slidably over, and which anchors against, the end of cylinder 44. The novel features of the wheel cylinder are more particularly claimed in application Serial No. 494,160, which is a division of the present case.

The two caps 42 and 62 are serrated at their peripheries to provide teeth by which they may be turned by small crown gears 64 (Figure 3) rotatably carried by shafts 66 journaled in openings in the backing plate, thereby turning the adjusting members 40 and 60 to compensate for wear of the lining 18. The adjustments so made are held by a leaf spring 68 formed at its ends as spring pawls interlocking with the teeth on the peripheries of the caps 42 and 62. A return spring 70 is tensioned between the upper ends of the shoes.

In operation, the pistons 46 and 54 are forced apart hydraulically to apply the brake. Piston 54 acts through plunger 56 directly on the shoe 16. Piston 46 acts through plunger 34 on the levers 32, thereby balancing its thrust and distributing it between the upper end of the shoe 14 and the link 30 which actuates the floating cam lever 24.

If the drum is turning clockwise, shoe 16 is actuated by piston 54 and anchors on the post 20, while shoe 14 is actuated by cam lever 24 and anchors on the cap 42. If the drum is turning counter-clockwise, the shoe 14 is actuated by the thrust of piston 46 on the levers 32 and anchors on the post 20, while the shoe 16 is actuated by the cam lever 24 and anchors on the cap 62.

The spring 70 may be made lighter than the spring 22, so that the upper ends of the shoes are first spread apart when hydraulic pressure is applied, and then one shoe or the other is wiped frictionally away from the anchor 20 into anchorage against one of the caps 42 or 62.

When used as a rear brake, the brake may also be applied mechanically by force from the usual emergency lever (not shown), through the medium of lever 78 passing horizontally through a slot in the backing plate and pivoted to thrust links 80 and 82 slidably guided by slots in brackets 84 and 86 and engaging the shoe webs.

In the embodiment of Figures 5-7 the brake is provided with automatic adjustment means, and the adjustments at 40 and 60 (if used at all) are used only to make initial factory adjustments to compensate for inaccuracies in manufacture.

In this embodiment the shoes (which may be provided with steady rests 90) are provided with stop devices automatically set by engagement with the brake drum to compensate for wear of the lining 18. Each of these stop devices comprises a plunger 92, of ceramic or other hard but non-scoring material, slidably mounted between lugs 94 on the side of the shoe web, with its outer portion extending through rectangular openings in the shoe rim and in the brake lining.

Each block 92 is formed with an inclined cam recess 96 embracing a square cam follower block 98 mounted on a pin 100. A spring 102, passing through one end of the recess 96 and through the plunger 92 and through the shoe web, is hooked at one end to a washer 104 engaging one side of the plunger 92, and has its other end formed into a conical coil seated against the side of the shoe web. This spring 104 holds the plunger 92 frictionally clamped against the shoe web, so that it will not move unless pushed inward by the brake drum.

The pin 100 extends eccentrically from (and may be integral with) a disk 106 pivotally received in a circular hole in the shoe web, and which is welded to a stop lever 108 extending downwardly alongside the shoe web, and which (when the brake is released) engages a roller 110 carried by an adjustable eccentric 112 mounted on the backing plate.

In order to cushion the shock as the anchorage shifts, the wheel cylinder 44 may have a central diaphragm 116 cooperating with a relatively small opening 118 to give a dashpot action in the wheel cylinder. In this case the sealing cups 48 and 52 are held by two springs 150 on opposite sides of the diaphragm.

The spring 70 may also be replaced by two springs 170 and 172 acting respectively on the shoes 14 and 16, the first being lighter than the second, so that in forward braking neither shoe shifts its anchorage.

In operation, the brake is actuated the same as the first embodiment. However, as the lining wears, the plungers 92 are gradually pushed inwardly by the drum, thereby shifting levers 108 to change the released positions of the shoes so that the clearance remains constant.

While two illustrative embodiments have been described in detail, it is not my intention to limit the scope of the invention to those particular embodiments, or otherwise than by the terms of the appended claims.

I claim:

1. A brake comprising, for use in combination with a drum, a pair of shoes which are shiftable individually to anchor at their opposite ends according to the direction of drum rotation, a mechanical applying device acting on the ends of both shoes at one side of the drum to spread them apart in applying the brake, a lever mounted on the other end of one shoe and which is connected to the mechanical applying device to operate it, and a fluid-pressure applying device acting on said lever and on the other end of the other shoe.

2. A brake comprising, for use in combination with a drum, a pair of shoes which are shiftable individually to anchor at their opposite ends according to the direction of drum rotation, a mechanical applying device acting on the ends of both shoes at one side of the drum to spread them apart in applying the brake, a lever mounted on the other end of one shoe and which is connected to the mechanical applying device to operate it, and another applying device acting on said lever and on the other end of the other shoe.

3. A brake comprising, for use in combination with a drum, a pair of shoes which are shiftable individually to anchor at their opposite ends according to the direction of drum rotation, a mechanical applying device acting on the ends of both shoes at one side of the drum to spread them apart in applying the brake, a lever mounted on the other end of one shoe and which is connected to the mechanical applying device to operate it, a fluid-pressure applying device acting on said lever and on the other end of the other shoe, and positioning means automatically actuated by engagement with the drum to compensate for wear of the shoes and setting the shoes in their released positions with substantially constant clearance relative to the drum, regardless of wear.

4. A brake comprising, for use in combination with a drum, a pair of shoes which are shiftable individually to anchor at their opposite ends according to the direction of drum rotation, a mechanical applying device acting on the ends of both shoes at one side of the drum to spread them apart in applying the brake, a lever mounted on the other end of one shoe and which is connected to the mechanical applying device to operate it, another applying device acting on said lever and on the other end of the other shoe, and positioning means automatically actuated by engagement with the drum to compensate for wear of the shoes and setting the shoes in their released positions with substantially constant clearance relative to the drum, regardless of wear.

5. A brake comprising, for use in combination with a drum, a pair of shoes which are shiftable individually to anchor at their opposite ends according to the direction of drum rotation, a mechanical applying device acting on the ends of both shoes at one side of the drum to spread them apart in applying the brake, a lever mounted on the other end of one shoe and which is connected to the mechanical applying device to operate it, a fluid-pressure applying device acting on said lever and on the other end of the other shoe, positioning means automatically actuated by engagement with the drum to compensate for wear of the shoes and setting the shoes in their released positions with substantially constant clearance relative to the drum, regardless of wear, and means associated with the last-named applying device for cushioning movement of the shoes in shifting to anchor at one end or the other.

6. A brake comprising, for use in combination with a drum, a pair of shoes which are shiftable individually to anchor at their opposite ends according to the direction of drum rotation, a mechanical applying device acting on the ends of both shoes at one side of the drum to spread them apart in applying the brake, a lever mounted on the other end of one shoe and which is connected to the mechanical applying device to operate it, another applying device acting on said lever and on the other end of the other shoe, positioning means automatically actuated by engagement with the drum to compensate for wear of the shoes and setting the shoes in their released positions with substantially constant clearance relative to the drum, regardless of wear, and means associated with the last-named applying device for cushioning movement of the shoes in shifting to anchor at one end or the other.

7. A brake comprising, for use in combination with a drum, a pair of shoes which are shiftable individually to anchor at their opposite ends according to the direction of drum rotation, a mechanical applying device acting on the ends of both shoes at one side of the drum to spread them apart in applying the brake, spring means holding the ends of the shoes adjacent said mechanical applying device anchored until overcome as to one shoe or the other by the frictional drag of the drum, a lever mounted on the other end of one shoe and which is connected to the mechanical applying device to operate it, and a fluid-pressure applying device acting on said lever and on the other end of the other shoe.

8. A brake comprising, for use in combination with a drum, a pair of shoes which are shiftable individually to anchor at their opposite ends according to the direction of drum rotation, a mechanical applying device acting on the ends of both shoes at one side of the drum to spread them apart in applying the brake, spring means holding the ends of the shoes adjacent said mechanical applying device anchored until overcome as to one shoe or the other by the frictional drag of the drum, a lever mounted on the other end of one shoe and which is connected to the mechanical applying device to operate it, and another applying device acting on said lever and on the other end of the other shoe.

9. A brake comprising, for use in combination with a drum, a pair of shoes which are shiftable individually to anchor at their opposite ends according to the direction of drum rotation, a mechanical applying device acting on the ends of both shoes at one side of the drum to spread them apart in applying the brake, spring means holding the ends of the shoes adjacent said mechanical applying device anchored until overcome as to one shoe or the other by the frictional drag of the drum, a lever mounted on the other end of one shoe and which is connected to the mechanical applying device to operate it, a fluid-pressure applying device acting on said lever and on the other end of the other shoe, and positioning means automatically actuated by engagement with the drum to compensate for wear of the shoes and setting the shoes in their released positions with substantially constant clearance relative to the drum, regardless of wear.

10. A brake comprising, for use in combination with a drum, a pair of shoes which are shiftable individually to anchor at their opposite ends according to the direction of drum rotation, a mechanical applying device acting on the ends of both shoes at one side of the drum to spread them apart in applying the brake, spring means holding the ends of the shoes adjacent said mechanical applying device anchored until overcome as to one shoe or the other by the frictional drag of the drum, a lever mounted on the other end of one shoe and which is connected to the mechanical applying device to operate it, another applying device acting on said lever and on the other end of the other shoe, and positioning means automatically actuated by engagement with the drum to compensate for wear of the shoes and setting the shoes in their released positions with substantially constant clearance relative to the drum, regardless of wear.

11. A brake comprising, for use in combination with a drum, a pair of shoes which are shiftable individually to anchor at their opposite ends according to the direction of drum rotation, a mechanical applying device acting on the ends of both shoes at one side of the drum to spread them apart in applying the brake, spring means holding the ends of the shoe adjacent said mechanical applying device anchored until overcome as to one shoe or the other by the frictional drag of the drum, a lever mounted on the other end of one shoe and which is connected to the mechanical applying device to operate it, a fluid-pressure applying device acting on said lever and on the other end of the other shoe, positioning means automatically actuated by engagement with the drum to compensate for wear of the shoes and setting the shoes in their released position with substantially constant celarance relative to the drum, regardless of wear, and means associated with the last-named applying device for cushioning movement of the shoes in shifting to anchor at one end or the other.

12. A brake comprising, for use in combination with a drum, a pair of shoes which are shiftable individually to anchor at their opposite ends according to the direction of drum rotation, a mechanical applying device acting on the ends of both shoes at one side of the drum to spread them apart in applying the brake, spring means holding the ends of the shoes adjacent said mechanical applying device anchored until overcome as to one shoe or the other by the frictional drag of the drum, a lever mounted on the other end of one shoe and which is connected to the mechanical applying device to operate it, another applying device acting on said lever and on the other end of the other shoe, positioning means automatically actuated by engagement with the drum to compensate for wear of the shoes and setting the shoes in their released position with substantially constant clearance relative to the drum, regardless of wear, and means associated with the last-named applying device for cushioning movement of the shoes in shifting to anchor at one end or the other.

13. A brake comprising, for use in combination with a drum, a pair of shoes individually shiftable to anchor at their opposite ends according to the direction of drum rotation, spring means holding one end of each shoe anchored unless overcome by the frictional drag of the drum to shift the shoe to an anchorage at its other end, positioning means automatically actuated by engagement with the drum to compensate for wear of the shoes and setting the shoes in their released positions with substantially constant clearance relative to the drum, regardless of wear, and applying means for said shoes having associated therewith means for cushioning movement of the shoes from one anchorage to the other.

14. A brake comprising, for use in combination with a drum, a pair of anchoring means, a pair of shoes at least one of which is individually shiftable to anchor at one of its ends on one of said anchoring means, or at its opposite end on the other of said anchoring means according to the direction of drum rotation, spring means holding one end of said one shoe anchored unless overcome by the frictional drag of the drum to shift the shoe to an anchorage at its other end, positioning means automatically actuated by engagement with the drum to compensate for wear of the shoes and setting the shoes in their released positions with substantially constant clearance relative to the drum, regardless of wear, and applying means for said shoes having associated therewith means for cushioning movement of said one shoe from one anchorage to the other.

RUDOLPH A. GOEPFRICH.